United States Patent
Akhavain et al.

(10) Patent No.: US 11,448,246 B2
(45) Date of Patent: Sep. 20, 2022

(54) MAGNETIC MULTIPLE AXIS MOUNTS

(71) Applicant: Hewlett-Packard Development Company, L.P., Spring, TX (US)

(72) Inventors: Roya Susan Akhavain, San Diego, CA (US); Matthew G. Lopez, San Diego, CA (US); Chun-Ying Wu, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/048,156

(22) PCT Filed: Jul. 26, 2018

(86) PCT No.: PCT/US2018/043826
§ 371 (c)(1),
(2) Date: Oct. 16, 2020

(87) PCT Pub. No.: WO2020/023040
PCT Pub. Date: Jan. 30, 2020

(65) Prior Publication Data
US 2021/0148387 A1 May 20, 2021

(51) Int. Cl.
*F16B 1/00* (2006.01)
*F16C 11/06* (2006.01)
*F16M 13/02* (2006.01)

(52) U.S. Cl.
CPC ............... *F16B 1/00* (2013.01); *F16C 11/06* (2013.01); *F16M 13/022* (2013.01); *F16B 2001/0035* (2013.01)

(58) Field of Classification Search
CPC combination set(s) only.
See application file for complete search history.

(56) References Cited

U.S. PATENT DOCUMENTS

| | | | | |
|---|---|---|---|---|
| 2,332,504 | A | * 10/1943 | Brenner | ................ F16M 11/14 248/181.1 |
| 2,764,716 | A | * 9/1956 | Minchom | ............ H01F 7/0252 335/284 |
| 4,016,583 | A | * 4/1977 | Yeates | ................... F16M 11/14 396/420 |
| 4,390,172 | A | 6/1983 | Gotman | |

(Continued)

FOREIGN PATENT DOCUMENTS

| | | |
|---|---|---|
| CN | 1675572 | 9/2005 |
| CN | 104345792 | 2/2015 |

(Continued)

OTHER PUBLICATIONS

Website, Magnetic Ball Joints universal—Ø 8 mm—25 mm, 2017, Magnosphere, May 24, 2018, 6 pages.

(Continued)

*Primary Examiner* — Monica E Millner
(74) *Attorney, Agent, or Firm* — Fabian VanCott

(57) ABSTRACT

A multi-axis mount including: a baseplate, the baseplate including an indent, the indent including multiple sloped sides; a pivot, the pivot including a magnetizable, partial ovoidal body, the pivot contacting the baseplate at no less than two sloped sides of the indent and at no more than three sloped sides of the indent; and a magnet located opposite the baseplate from the pivot, the magnet to attract the pivot against the baseplate.

20 Claims, 6 Drawing Sheets

(56) References Cited

U.S. PATENT DOCUMENTS

| | | | |
|---|---|---|---|
| 4,453,300 A | 6/1984 | Klimek et al. | |
| 5,790,910 A | 8/1998 | Haskin | |
| 6,209,830 B1* | 4/2001 | Brotz | F16M 11/14 |
| | | | 248/181.2 |
| 6,350,076 B1 | 2/2002 | Wagner et al. | |
| 6,746,172 B2 | 6/2004 | Culpepper | |
| 6,803,738 B2 | 10/2004 | Erten | |
| 6,875,205 B2 | 4/2005 | Leinsing | |
| 6,919,787 B1* | 7/2005 | Macken | H01F 7/0242 |
| | | | 335/285 |
| 7,163,181 B2 | 1/2007 | Omps | |
| 7,170,285 B2 | 1/2007 | Spratte | |
| 7,621,492 B2* | 11/2009 | Omps | F16C 11/0619 |
| | | | 248/181.1 |
| 8,366,064 B2* | 2/2013 | Chen | F16M 13/022 |
| | | | 248/181.1 |
| 8,602,376 B2* | 12/2013 | Vogel | H05K 5/0204 |
| | | | 248/371 |
| 9,661,197 B2 | 5/2017 | Clearman | |
| 10,113,688 B2* | 10/2018 | Zhu | F16M 13/02 |
| 2007/0099469 A1* | 5/2007 | Sorensen | A45F 5/02 |
| | | | 439/289 |
| 2007/0114346 A1 | 5/2007 | Omps | |
| 2008/0054541 A1 | 3/2008 | Dixon et al. | |
| 2009/0238637 A1* | 9/2009 | Spratte | F16C 11/0642 |
| | | | 403/127 |
| 2011/0188925 A1* | 8/2011 | Komine | F16C 11/106 |
| | | | 403/83 |
| 2015/0250065 A1* | 9/2015 | Hornick | F16M 11/14 |
| | | | 248/206.2 |
| 2016/0003270 A1* | 1/2016 | Franklin | H01F 7/0221 |
| | | | 439/529 |
| 2016/0138754 A1 | 5/2016 | Li | |
| 2016/0259374 A1* | 9/2016 | Breiwa | B60R 11/02 |
| 2017/0108034 A1 | 4/2017 | McGuire et al. | |
| 2017/0318200 A1 | 11/2017 | Cox et al. | |
| 2018/0128317 A1 | 5/2018 | Horchheimer et al. | |

FOREIGN PATENT DOCUMENTS

| | | |
|---|---|---|
| CN | 204692945 | 10/2015 |
| CN | 206458976 | 9/2017 |
| DE | 4142954 | 7/1993 |
| RU | 158353 A | 10/1963 |
| WO | WO-2016003282 | 1/2016 |

OTHER PUBLICATIONS

Patrick Willoughby: "Kinematic Alignment of Precision Robotic Elements in Factory Environments" In: "Kinematic Alignment of Precision Robotic Elements in Factory Environments", Jan. 1, 2082 (Jan. 81, 2002), Massachusetts Institute of Technology, XP055005531,p. 51-52.

* cited by examiner

MAGNETIC MULTIPLE AXIS MOUNTS

BACKGROUND

Mounts are used to support and/or position equipment during use. A mount holds the equipment at a selected position and/or orientation, freeing the user's hands for other activities. A mount should hold the equipment without shaking and/or moving, which may make use of the associated equipment difficult. Mounts may be used to support a variety of equipment, including cameras, sensors, and monitors. A mount may be permanently installed and/or may be used in short term setups.

BRIEF DESCRIPTION OF THE DRAWINGS

The accompanying drawings illustrate various examples of the principles described herein and are a part of the specification. The illustrated examples do not limit the scope of the claims.

Figure 1:
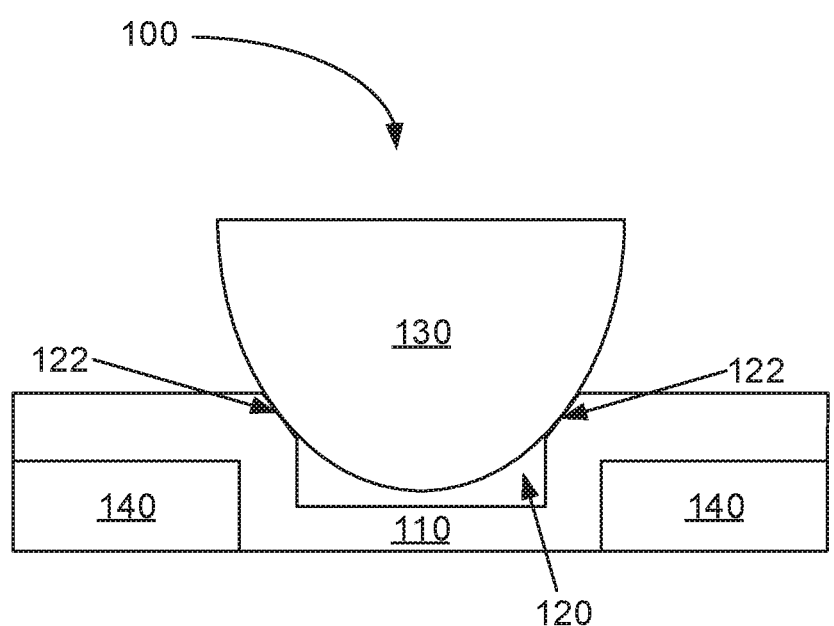
FIG. 1 shows an example multi-axis mount consistent with this specification.

Throughout the drawings, identical reference numbers designate similar, but not necessarily identical, elements. The figures are not necessarily to scale, and the size of some parts may be exaggerated or minimized to more clearly illustrate the example shown. The drawings provide examples and/or implementations consistent with the description. However, the description is not limited to the examples and/or implementations shown in the drawings.

DETAILED DESCRIPTION

Mounts are used to hold equipment during use. For example, cameras may be located and oriented in a particular direction to record a desired activity without being held and/or stabilized by a person.

A mount should provide sufficient resistance to adjustment such that the mount remains oriented in the desired direction over time. A mount should have a low enough stiction/friction that adjustment is not unreasonably difficult. A mount may be adjustable with one hand. In some cases, a low profile is useful. Similarly, it may be useful to not use adjustment of screws, clamps, clips, and/or other adjustors to control the stiction of the mount.

Controlling the stiction of the mount involves controlling the contact points between the pivot and the baseplate. By designing the contact points and assuring reliable surface area and materials at the contact points, the variation in stiction may be reduced. Some mounts use a soft polymer on one side of the mount. This material surface is vulnerable to wear and remodeling, both of which may impact the contact area and the stiction of the joint. This variation may be compensated for by using a secondary method of controlling the contact force, such as a collar and/or similar to avoid slippage of the mount from a desired orientation. Similarly, camera tripods often include a screw which is loosened to adjust the orientation and then retightened to stabilize the tripod. These screws may have long and elaborate handles to facilitate use. Such screws may require both hands to adjust the orientation of the mount. Such mounts may have limited stability without tightening the screws. These screws increase the time it takes to make adjustments to the mount. Such mounts may provide inconsistent adjustment forces depending on the screw position. In contrast, this specification describes a mount that may function without such adjustment screws, clamps, nuts, handles, etc.

This specification describes a multiple axis (multi-axis) mount which uses a designed two or three point contact and magnetic attraction to provide predictable and stable contact between the baseplate and the pivot, the pivot attachable to the desired piece of equipment, e.g. a camera, a monitor, a sensor, etc.

As used in this specification and the associated claims, a hemiovoid is a geometric solid with a circular cross section perpendicular to a first axis and the cross section along the first axis is half of an ellipse and/or oval. A circle is a special case of an ellipse, where the a and b axes of the ellipse are of equal length.

As used in this specification and the associated claims, a "partial ovoidal" body is a portion of a solid body with a first, circular cross section and a second cross section perpendicular to the first, circular cross section, where the second cross section is a portion of an ellipse and/or oval. When the portion is 50%, a partial ovoidal solid is a hemiovoid. A partial ovoidal solid, however, may be more, e.g., 60%, or less, e.g. 35%, of the ovoidal solid. A determination of the optimal percentage will depend on the shape of the mounted object and the desired rotational range of motion of the mount. A partial ovoidal solid can be visualized as an ellipse and/or oval that is rotated around its major or minor axis and then a portion of the resulting solid is removed, for example, by a planar cut through the solid. The planar cut maybe orthogonal to the major or minor axis. The cut may be angled relative to the axes. The cut surface may be flat. The cut surface may be modified to provide features to facilitate attachment, for example, holes, ridges, divots, slots, etc.

In an example, this specification describes a multi-axis mount including: a baseplate, the baseplate including an indent having multiple sloped sides; a pivot, the pivot comprising a magnetizable, partial ovoidal body, the pivot contacting the baseplate at no less than two sloped sides of the indent and at no more than three sloped sides of the indent; and a magnet located opposite the baseplate from the pivot, the magnet to attract the pivot against the baseplate.

This specification also describes a multi-axis mount including: a baseplate of a magnetizable material, the baseplate including an indent, the indent including two facing sloped sides; a pivot, the pivot including a face and a hemiovoidal magnetizable body, the pivot contacting the baseplate at both facing sloped sides of the indent and the pivot not contacting the baseplate elsewhere; and a magnet located opposite the baseplate from the pivot, the magnet to attract the pivot against the baseplate.

This specification also describes a multi-axis mount including: a baseplate, the baseplate comprising an indent, the indent having three sloped sides; a pivot, the pivot comprising a hemispherical magnetizable body with a face, the face comprising an opening to attach the object, the pivot contacting the baseplate on each of the three sloped sides of the indent and the pivot not contacting the baseplate elsewhere; and a ring magnet located behind the baseplate opposite from the pivot, the ring magnet including an opening in the center of the circle, the magnet to attract the magnetizable pivot against the baseplate such that when the mount is assembled, a portion of the pivot is within the opening of the circular magnet.

Turning now to the figures, FIG. 1 describes a multi-axis mount (100) in an example consistent with this specification. The multi-axis mount (100) includes: a baseplate (110), the baseplate (110) including an indent (120), the indent (120) including multiple sloped sides (122); a pivot (130), the pivot (130) comprising a magnetizable, partial ovoidal body, the pivot (130) contacting the baseplate (110) at no less than two sloped sides (122) of the indent (120) and at no more than three sloped sides (122) of the indent (120); and a magnet (140) located opposite the baseplate (110) from the pivot (130), the magnet(140) attracting the pivot (130) against the baseplate (110).

The mount (100) is a multiple axis mount (100) which may be used to support and orient an object. The mount (100) may be secured to a support, such as a wall, ceiling, desk, etc. The mount (100) may include a mounting hole and/or mounting holes to secure the mount to the support. The baseplate (110) and the magnet (140) may be secured in place and then the pivot (130) brought into position to contact the baseplate (110). The pivot may be secured to a mounted object prior to magnetically connecting the pivot (130) to the baseplate (110).

The ability to secure the baseplate (110) and the pivot (130) to the support and the mounted object prior to connecting the pivot (130) to the baseplate (110), which is held in place without mechanical adjustable features such as pins, screws, clamps, etc., makes assembling and/or disassembling this multiple axis mount (100) easy to accomplish despite the low profile of the mount (100). All the tool activities can be performed prior to assembly in an orientation which is optimal for connecting the mount (100) and/or baseplate (110) to the support and the mounted object to the pivot (130).

It may be helpful to use non-magnetizable tools and hardware when connecting the baseplate (110) to the support. In an example, the mounting holes are perpendicular to the baseplate (110). The magnet (140) may pull on screws and/or bolts placed in the mounting holes. This attraction may make installing the hardware more challenging but may also increase the force to dislodge the baseplate (110) from the support.

The baseplate (110) includes an indent (120). The indent includes two facing sloped sides. The two facing sloped sides contact the pivot (130). The ability to design in the contact points between the baseplate (110) and the pivot (130) provides consistency in forces which may be difficult to replicate with other approaches. The baseplate (110) is between the magnet (140) and the pivot (130). The magnet (140) pulls the pivot (130) against the baseplate (110) to hold the joint together.

The baseplate (110) may be made of a magnetizable material. The benefit of using a magnetizable material is the ability to increase the pull of the magnet (140) on the pivot (130). To increase the pull by the magnet (140), it is useful to keep the gap between the baseplate (110) and the pivot (130) small but non-contacting except at the contact points on the sloped sides of the indent (120). Keeping the gap small but non-contacting increases the magnetic attraction of the pivot (130) to the baseplate (110) without increasing the friction and/or providing another wear/contact point. The use of a hemisphere and/or other spherical shape to the pivot may minimize the needed gap between the baseplate (110) and the pivot (130). In contrast, if the pivot (130) is a non-spherical ovoid shape, a larger gap will be needed to avoid contact when the pivot (130) pivots.

The baseplate (110) may have a wear resistant coating applied. The coating applied to the baseplate (110) may be softer than the coating applied to the pivot (130). The coating on the baseplate (110) may be a manganese phosphate coating. The coating may provide aesthetic coloration. The coating may be elected to allow painting of the baseplate (110). In an example, the baseplate comes with a sticker and/or other masking template to place over the indent during painting. The masking template may come pre-applied and may include a tab and/or similar extension to facilitate removal after the paint has been applied but prior to the paint drying.

The indent (120) has sloped sides (122). The sloped sides (122) provide contact points between the baseplate (110) and the pivot (130). The indent (120) may be an oval, a line, a marquise, and/or another shape. Several examples of the indent (120) shape are found in FIGS. 2 and 4, below. If the sloped sides (122) come closer together as one moves laterally, like in an oval and/or marquise, this will have the tendency to restore the pivot (130) toward the center of the indent (120). As the sloped side (122) to sloped side (122) separation decreases, the pivot is moved away from the magnet, decreasing the attractive force of the magnet (140) on the pivot (130). This will produce a restoring tendency to favor motion toward the larger portion of the indent (120). The rate at which the sloped sides (122) come together may be used to impact this restoring force. A variety of indent (120) shapes may be used to produce suitable profiles.

The indent (120) may have a bottom formed of the baseplate (110). The indent (120) may have an opening in the center so that the indent (120) is a slot and/or similar. The indent (120) may have two linear edges facing each other. The indent (120) may have two curved edges facing each other with the concave portion of the curve toward the center of the indent.

The indent (120) may have a curved sloped surface (122). The indent (120) may have a curvature that is close to that of the corresponding portion of the pivot (130). The indent (120) may have a smaller radius of curvature than the corresponding portion of the pivot (130). This facilitates the pivot contacting both walls of the indent without contacting the bottom of the indent (120). The radius of curvature may change over the indent (120), with the center of the indent having a smaller radius of curvature and the entry having a larger radius of curvature. In an example, the clearance between the non-contacting points of the indent (120) and the pivot (130) is less than 5 millimeters (mm). The clearance may be less than 2 mm. The clearance may be less than 1 millimeter. Smaller clearances tend to increase the magnetic attraction on the pivot (130) against the baseplate (110). Smaller clearances also imply tighter tolerances, which have higher manufacturing costs and may be less robust to environmental variation, including temperature and humidity.

The indent (120) has sloped sides (122) which contact the pivot (130) and provide a reliable and repeatable coefficient of friction (both static and dynamic). The indent (120) may include two sloped sides (122), for example, the indent (120) may include two linear sloped sides (122) which are parallel. The indent (120) may include two curved sloped sides (122) which form an oval, a marquise, a vesica piscis, and/or a similar shape. The indent (120) may include a straight sloped side (122) and a curved sloped side (122). The indent (120) may be a diamond shape. The indent (120) may have parallel sloped sides which taper together to form points and/or curves.

The indent (120) may have three sloped sides (122) which contact the pivot (130). The indent (120) may resemble an equilateral triangle (or more properly a tetrahedron), an isosceles triangle, a right triangle, and/or another triangle. Because the points of the triangle are not intended to contact the pivot (130), the points of the triangle may be filled in with material of the baseplate (130) and/or rather, not machined out. This forms a shape similar to an irregular hexagon. Similarly, a variety of two, three, four, five, six sided profiles with combinations of curved and/or straight sides may be used to form the indent (120).

The sloped sides (122) of the indent provide the contact surface between the baseplate (110) and the pivot (130). The sloped sides may be linear. The sloped sides (122) may be curved. The sloped sides (122) may be tiered and/or terraced.

The pivot (130) includes a baseplate (110) contacting surface and a mounting surface. The baseplate (110) contacting surface is a partial ovoidal body. The baseplate (110) contacting surface may be a partial sphere. The baseplate contacting surface may be a hemiovoid. The baseplate contacting surface may be a hemisphere. The baseplate contacting surface may be 30%, 40%, 50%, 60%, 70%, and/or some other percentage of a sphere and/or ovoid. A definition of ovoid is provided above. An ovoid has a circular cross section and, orthogonal to that cross-section, an ellipse and/or oval cross section. This includes spheres where the ellipse is a circle.

The pivot (130) may include a coating. The coating may have a hardness greater than the body of the pivot (130). For example, the pivot (130) may have a chrome coating. The pivot (130) may have a strike under the coating to increase adhesion and/or provide another benefit. The strike may be a copper strike. The pivot may have a vapor deposited coating. For example, the pivot (130) may have a diamond-like carbon (DLC), titanium nitride, titanium oxide, SiC, SiN, and/or similar hard vapor deposited coating. The coating may provide wear resistance. The coating may provide an aesthetic modification to the joint.

The magnet (140) provides an attractive force on the pivot (130) such that the pivot (130) is pulled against the baseplate (110). The magnet (140) may be a rare earth magnet. Such materials are challenging to form into detailed shapes. Accordingly, forming the magnet into a simple shape, like a ring, disk, torus, etc. is substantially cheaper than trying to machine the baseplate (110) out of the magnet (140). In the described approach, the baseplate (110) also protects the magnet from mechanical impacts such as the pivot (130) being drawn against the magnet (140). Selecting a magnetizable material as the baseplate (110) and minimizing the gap between the baseplate (110) and the pivot (130) provides a low cost way to maximize the strength of the magnetic field on the pivot (130).

A variety of high strength magnetic materials have become widely available with neodymium magnets being invented in the 1980s. These materials, known collectively as rare earth magnets, produce larger magnetic fields than lower strength iron, nickel, manganese-aluminum, and/or cobalt-based magnets. Samarium-cobalt magnets (e.g., $SmCo_5$) and neodymium based magnets (e.g., $Nd_2Fe_{14}B$) are generally available for purchase from commercial suppliers. As mentioned above, machining these magnets into complex shapes is expensive and dangerous. Further, these materials tend to be brittle compared with metals. Accordingly, the use of a baseplate (110) provides more control over the wear surfaces, mechanical protection, ease of machining, and/or other features not found when using a pivot directly on such a rare earth magnet.

The specifics of the magnet (140) are flexible due to the design approach. Stronger magnets (140) provide increased holding force of the pivot (130) against the baseplate (110). Stronger magnets (140) may also increase the force to adjust the pivot (130) orientation. However, because a lever arm is available to act on the pivot (130) these increases in force may not pose a practical issue. Accordingly, the design approach can accommodate new magnet materials and similar developments, often without a need to change the designs of the baseplate (110) and/or pivot (130).

The mount (100) may include a badge. A badge is a flat plate of a magnetizable material which may be attached to a component to be supported by the mount. The badge provides additional attraction to the pivot. The badge may facilitate mounting. The badge may include pins, holes, ridges, and/or similar connectors to interface with a mounting surface on the pivot.

The mount (100) may lack mechanical adjustors. The mount (100) may lack components to adjust the frictional force between the sloped sides of the indent (120) and the partial ovoid of the pivot (130). The mount (100) does not include clamps, and/or similar shims to adjust the frictional forces. Unlike systems which used mechanical adjustment to regulate the contact friction between the ball and joint, in the present system, the contact surfaces are predefined, wear resistant, and repeatable. This reduces the variation which was addressed by manual compensation by users. This was a potential issue with soft contacts surfaces, like polymer contact surfaces and/or similar, where the amount of contact and friction of the contact varied between adjustments. This allows a user to adjust the position of the mounted object with a single hand, without a second hand to secure the mounted object in place after adjustment.

FIGS. 2A-F show examples of indents (120) with two contact points consistent with this specification. The indents (120) are each shown as a plan view (overhead) on baseplate (110). The indents (120) include a variety of shapes. The shapes of the indents (120) have some common characteristics. They have a width greater than their height when viewed as in FIG. 2. This encourages the circular cross-section of the ovoidal solid of the pivot (130) to contact the indent (120) at two positions in a vertical line from each other. The height of the indent (120) may decrease laterally. As discussed above, this may provide a restorative force back toward the center when the pivot (130) is rotated and/or translated.

Figure 2A:
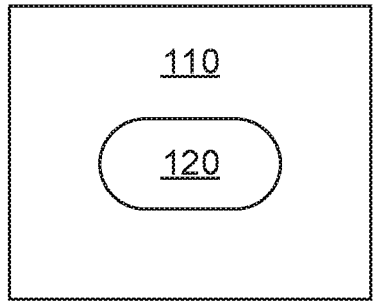
FIGS. 2A-F show examples of indents with two contact points consistent with this specification.

FIG. 2A shows an oval and/or ellipse indent (120) on a baseplate (110).

Figure 2B:
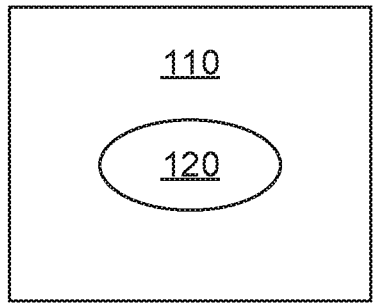

FIG. 2B shows a rounded rectangular indent (120) on a baseplate (110).

Figure 2C:
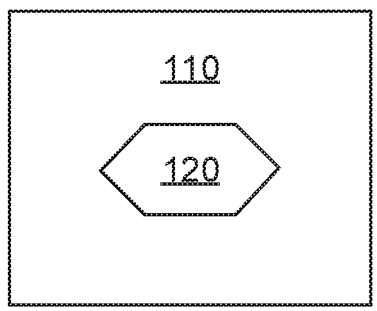

FIG. 2C shows a rectangular with pointed sides indent (120) on a baseplate (110).

Figure 2D:
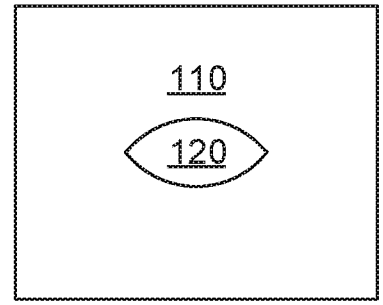

FIG. 2D shows a marquise, a pointed oval, and/or a vesica piscis indent (120) on a baseplate (110).

Figure 2E:
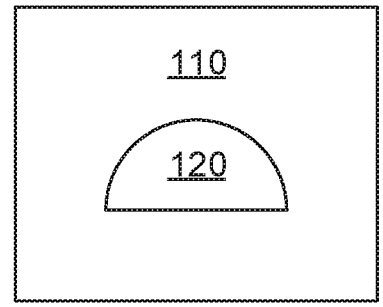

FIG. 2E shows a semicircular indent (120) on a baseplate (110).

Figure 2F:
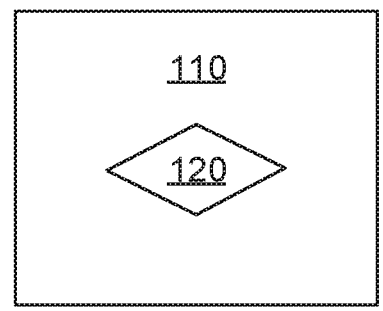

FIG. 2F shows a diamond indent (120) on a baseplate (110). This is similar to the indent (110) in FIG. 2D but with the rectangular portion removed and/or shrunk.

In an example, the baseplate (110) is mounted to a vertical support, such as a wall. The baseplate (110) may be oriented so that the contact points of the indent (120)-pivot (130) contacts are vertical from each other. This maximizes the lever arm resisting vertical rotation of the pivot (130), for example, under the influence of gravity on a mounted object. This may minimize the lever arm resisting lateral rotation of the pivot (130).

The attraction force between the pivot (130) and the magnet (110) depends on a number of factors. This attraction force should be sufficient to hold the pivot and anything mounted to the pivot against the baseplate (110). The attraction force should not be so high as to require excessive force to adjust the orientation of the pivot (130) relative to the baseplate (110). In an example, the magnetic force between the pivot (130) and the baseplate is described by the function $Mu*Qm1*Qm2/(4*pi*r1^2)$, where Mu is magnetic field strength generated by the magnet (140), Qm1 is the magnetic permeability of the material forming the pivot (130), Qm2 is the magnetic permeability of the material forming the baseplate (110), pi is the constant defining the circumference of a circle divided by diameter, R1 is the separation between the pivot (130) and the baseplate (110).

The magnet (140) transfers its pull force from the magnet (140) to the material of the baseplate (110). As the gap between the pivot (130) and the baseplate (110) r1 increases, the magnetic force becomes weaker. Conversely as the gap between the pivot (130) and the baseplate decreases, the magnetic force becomes stronger. The magnetic force varies as function of the gap distance squared.

The moment to resist motion of the pivot (130) is a function of the magnetic force and the separation between the contact points (r2). The moment force varies proportionally to the separation between the contact points (r2). One can use these two relationships to balance the design between the torque to adjust the pivot and the retaining force of the pivot (130) against the baseplate (110).

Figure 3A:
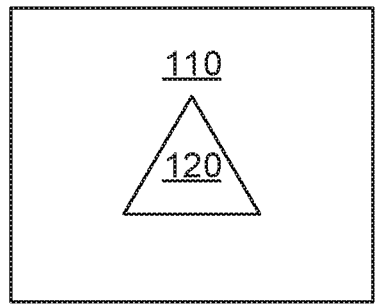
FIGS. 3A-C show examples of indents with three contact points consistent with this specification.
Figure 3B:
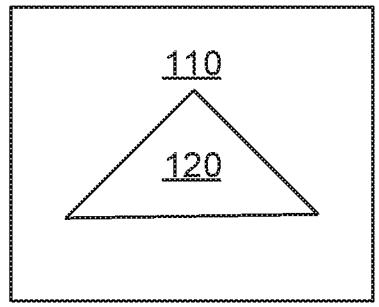
Figure 3C:
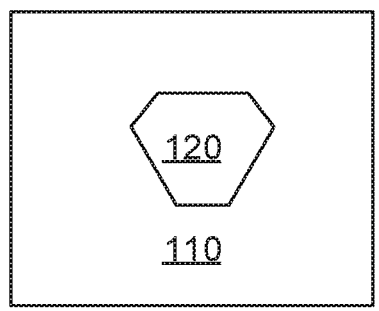

FIGS. 3A-C show examples of indents (120) with three contact points consistent with this specification. The indent (120) is formed in the baseplate (110). The examples are shown in plan view looking down on the indent (120).

FIG. 3A shows an equilateral triangle indent (120) on a baseplate (110).

FIG. 3B shows an isosceles triangle indent (120) on a baseplate (110). The indent (120) may be a right triangle. The indent (120) may be an isosceles right triangle. The indent (110) may be a triangle with three different length sides.

FIG. 3C shows six sided indent (120) on a baseplate (110). The sides may be straight as seen in FIG. 3C. The sides may be curved. A six sided shape is similar to the three sided shapes except that the unused portions of the points of the triangle have not been removed. This increases the amount of the baseplate (110) material nearby. As discussed above, the magnetizable baseplate material increases the magnetic force pulling the pivot (130) against the baseplate (110). In an example, the six sided shape approaches a circle. However, the three sides making contact are closer than the three non-contacting sides to assure reliable and predictable contact friction and forces.

The use of three contact points provides arms to resist motion in vertical and lateral rotation. Depending on the shape of the indent (120) selected, these forces' resistance may be the same or different, depending on the separation of the contact points vertically vs. laterally.

Figure 4:
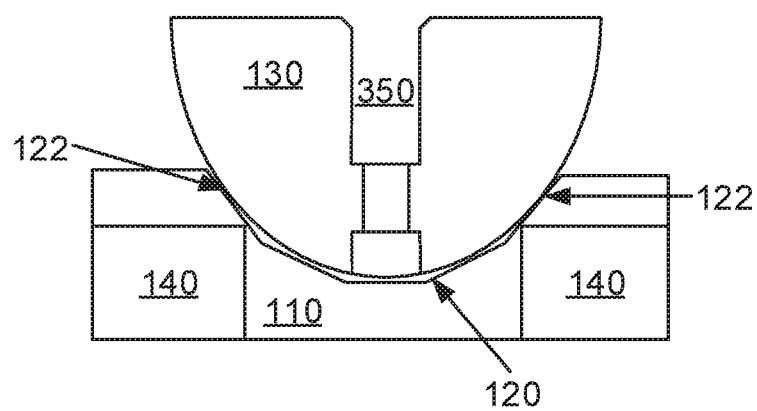
FIG. 4 shows an example multi-axis mount consistent with this specification.

FIG. 4 shows an example of a multi-axis mount (100) consistent with this specification. The mount (100) including: a baseplate (110) of a magnetizable material, the baseplate (110) including an indent (120), the indent (120) including two facing sloped sides (122); a pivot (130), the pivot (130) including a face and a hemiovoidal magnetizable body, the pivot (130) contacting the baseplate (110) at both facing sloped sides (122) of the indent (120) and the pivot (130) not contacting the baseplate (110) elsewhere; and a magnet (140) located opposite the baseplate (110) from the pivot (130), the magnet (140) attracting the pivot (130) against the baseplate (110). FIG. 4 includes a mounting cavity 350 in the pivot (130).

The mounting cavity (350) allows a bolt to be threaded through the pivot and into a badge and/or the piece of equipment being mounted. This operation is straight forward. The pivot (130) is placed over the portion of the piece of equipment and the hole in the pivot (130) aligned with a threaded hole in the piece of equipment. A bolt is then passed through the hole in the pivot and into the threaded hole in the piece of equipment. The head of the bolt is selected so as to not pass through the hole in the pivot (130). A washer maybe used to prevent passage of the bolt head if needed. The piece of equipment may include a protraction which interacts with the mounting cavity (350). The mounting cavity (350) may include a latch, retainer, set screw, and/or similar element to secure the pivot to the piece of equipment. All this activity may be performed using just the pivot (130). The baseplate (110) may be installed at the desired location. The pivot and piece of equipment are then guided into place over the indent (120) with the sloped sides (122) of the indent (120) centering and guiding the pivot to alignment.

This approach also allows the equipment to be readily removed and swapped out. Multiple pivots (130) may be attached to different pieces of equipment allowing rapid exchange while still providing stability.

The mount (100) may include the magnet (140) being a rare earth magnet (140), the pivot (130) being steel, the baseplate (110) being steel, the pivot (130) including a first coating, and the sloped sides (122) of the indent (120) where the pivot (130) makes contact including a second coating with a lower hardness than the first coating. The first coating may be chrome plating over a copper strike and the second coating may be a manganese phosphate coating. The rare earth magnet (140) may be a neodymium rare earth magnet (140).

FIGS. 5A-F show examples of pivots (130) consistent with this specification.

Figure 5A:
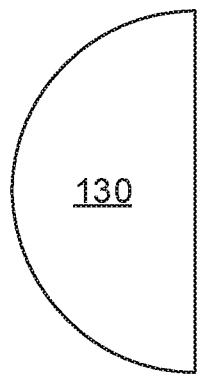
FIGS. 5A-F show examples of pivots consistent with this specification.

FIG. 5A shows a side view of a hemispherical pivot (130).

Figure 5B:
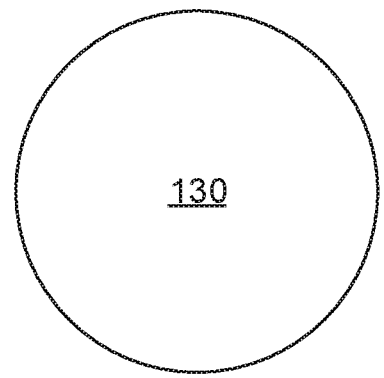

FIG. 5B shows a front view of a pivot. The pivot (130), whether a hemisphere, a partial sphere, a hemiovoid, and/or a partial ovoid has a circular cross section in this view. The face used to attach to the supported item, may be flat as show. The face may include a cavity, connection points, guides, ridges, etc. to facilitate connection to the supported item.

Figure 5C:
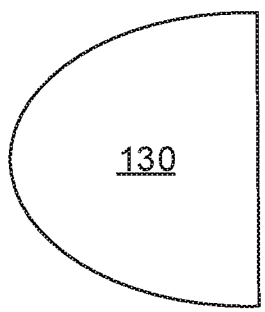

FIG. 5C shows a side view of a hemiovoidal pivot (130). This hemiovoidal pivot has an oval cross section in the side view. This hemiovoidal pivot (130) has a circular cross section from the front and/or rearview.

Figure 5D:
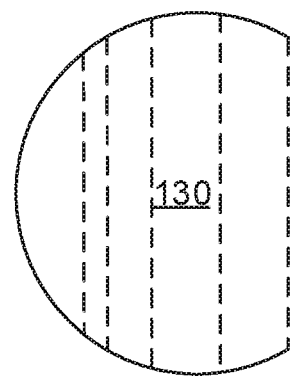

FIG. 5D. shows a partial spherical pivot (130). The dashed lines show examples where other partial spherical pivots (130) could be cut. Partial spherical pivots with greater than 50% of the associated sphere may have greater range of motion.

Figure 5E:
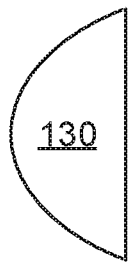

FIG. 5E shows a partial ovoidal pivot (130). This particular version has a low profile (lateral in the figure). Other partial ovoidal pivots are also envisioned, including pivots (130) which are more than 50% of the ovoidal solid.

Figure 5F:
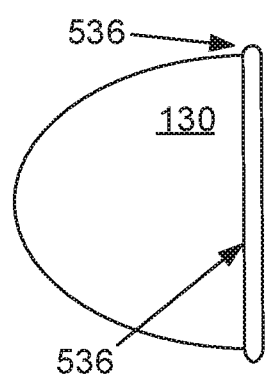
Figure 6:
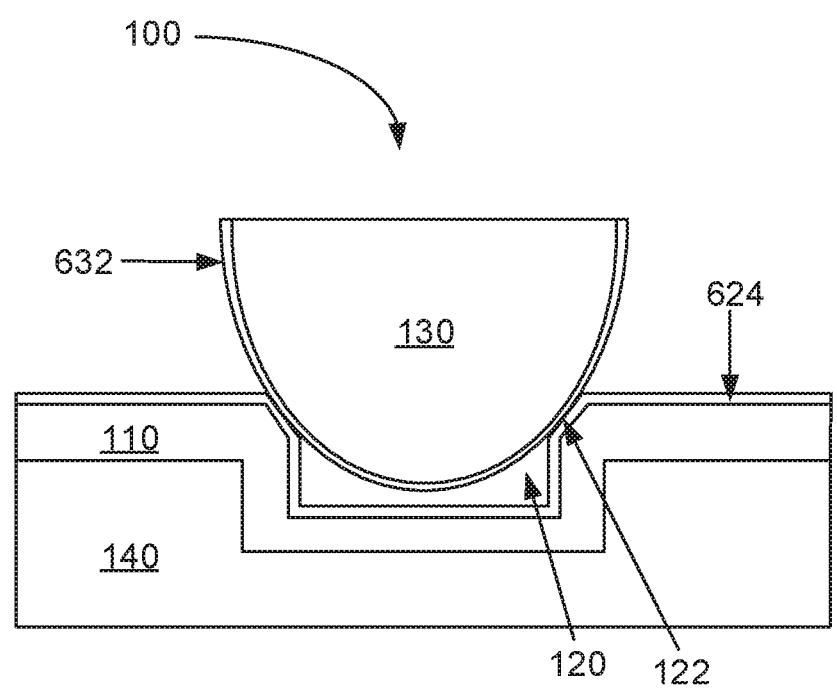
FIG. 6 shows an example of a multi-axis mount consistent with this specification.

FIG. 5F shows a hemiovoidal pivot (130) with a rim (536). The rim may encircle the pivot (130) as shown. The rim (536) may encompass a portion of the pivot (130). The rim may be discontinuous, for example, being small bumps and/or lines. The rim (536) provides a controlled stop when rotating the pivot FIG. 6 shows an example of a multi-axis mount (100) consistent with this specification. The mount (100) including: a baseplate (110) of a magnetizable material, the baseplate (110) including an indent (120), the indent (120) including three facing sloped sides (122); a pivot (130), the pivot (130) including a face and a partial spherical magnetizable body, the pivot (130) contacting the baseplate (110) at the three facing sloped sides (122) of the indent (120) and the pivot (130) not contacting the baseplate (110) elsewhere, the pivot (130) includes a first coating (632) on a baseplate contacting surface of the pivot (130); and a magnet (140) located opposite the baseplate (110) from the pivot (130), the magnet (140) attracting the pivot (130) against the baseplate (110), the baseplate (130) includes a second coating (624) on the sloped sides (122) of the indent (120).

The first coating (632) is on the baseplate (110) contacting portion of the pivot (130). The first coating (632) may have a greater hardness than the material of the pivot (130). The first coating (632) may increase wear resistance of the pivot (130). The first coating (632) may provide an aesthetic benefit, such as color and/or texture to the pivot (130). The first coating (632) may be on just the contact portions of the pivot (130). The first coating (632) may be on all surfaces of the pivot (130).

In an example, the first coating (632) is a chrome plating over a copper strike. This allows the use of a more readily magnetizable material for the body of the pivot (130) while still getting the appearance and hardness of the chrome at the wear surfaces. The first coating (632) may be a metal plating. The first coating (632) may be a dip and/or vapor deposited coating. The first coating (634) may be conductive or an insulator. Many of the hard vapor deposited coatings such as SiC, SiN, DLC, etc. are suitable coatings for the pivot (130).

The second coating (624) is on the baseplate (110). The second coating may be applied generally to the baseplate (110). The second coating (624) may be localized to the indent (120) and/or the sloped side (122) of the indent (120) where the pivot (130) contacts the baseplate (110). The second coating (624) may minimize wear between the baseplate (110) and the pivot (130). The second coating (624) may be harder or softer than the first coating (632). The first (632) and second coatings (624) may be selected as a pair to provide the desired wear resistance. Providing two coatings with similar properties can produce worse wear than selecting two coatings with different properties.

In an example, the second coating (624) is a manganese phosphate. The second coating (624) may be electroless nickel plating, nickel electroplating, zinc galvanization and/r any anti-corrosion oil The first (632) and second (624) coatings may be non-polymer coatings. Polymer coatings tend to conform to the contact, increasing the coating area over a point contact. This may increase the stiction to be overcome to adjust the pivot (130) relative to the baseplate (110). Polymer coatings may wear at higher rates than non-polymer coatings.

It will be appreciated that, within the principles described by this specification, a vast number of variations exist. It should also be appreciated that the examples described are only examples, and are not intended to limit the scope, applicability, or construction of the claims in any way.

What is claimed is:

1. A multi-axis mount comprising:
   a magnetizable baseplate, the baseplate comprising an indent, the indent comprising multiple sloped sides;
   a pivot, the pivot comprising a magnetizable, partial ovoidal body, the pivot contacting the baseplate at no less than two sloped sides of the indent and at no more than three sloped sides of the indent; and
   a magnet located on an opposite side of the magnetizable baseplate from the pivot, the magnet to attract the pivot against the baseplate.

2. The mount of claim 1, wherein the pivot comprises a plated coating.

3. The mount of claim 2, wherein the plated coating comprises a chrome coating.

4. The mount of claim 1, wherein the baseplate has a radius of curvature slightly smaller than the corresponding radius of curvature of the pivot.

5. The mount of claim 1, wherein pivot contacts the baseplate at no more than two points.

6. The mount of claim 1, wherein a surface of the baseplate at the indent comprises a wear resistant coating.

7. The mount of claim 6, wherein the wear resistant coating is manganese phosphate.

8. The mount of claim 1, wherein the indent forms a marquise.

9. The mount of claim 1, further comprising a badge, the badge to attach to a mounted object, the badge to contact a flat surface of the pivot.

10. The mount of claim 1, wherein the mount lacks mechanical adjustors.

11. A multi-axis mount comprising:
    a baseplate of a magnetizable material, the baseplate comprising an indent, the indent comprising one straight edge and two facing sloped sides;
    a pivot, the pivot comprising a face and a hemiovoidal magnetizable body, the pivot contacting the baseplate at both facing sloped sides of the indent and the pivot not contacting the baseplate elsewhere; and
    a magnet located on an opposite side of the baseplate from the pivot, the magnet to attract the pivot against the baseplate.

12. The mount of claim 11, wherein the magnet is a rare earth magnet, the pivot is steel, the baseplate is steel, the pivot comprises a first coating, and the sloped sides of the indent where the pivot makes contact comprise a second coating with a lower hardness than the first coating.

13. The mount of claim 12, wherein the first coating is a chrome plating over a copper strike, the second coating is a manganese phosphate coating, and the rare earth magnet is a neodymium rare earth magnet.

14. A multi-axis mount comprising:
    a baseplate, the baseplate comprising an indent, the indent having three sloped sides;
    a pivot, the pivot comprising a hemispherical magnetizable body with a face, the face comprising an opening to attach an object, the pivot contacting the baseplate on each of the three sloped sides of the indent and the pivot not contacting the baseplate elsewhere; and
    a ring magnet located behind the baseplate from the pivot, the ring magnet including a central opening, the magnet to attract the magnetizable pivot against the baseplate such that when the mount is assembled a portion of the pivot is within the opening of the ring magnet.

15. The mount of claim 14, further comprising a first coating on the pivot and a second coating on the baseplate where the baseplate contacts the pivot, the second coating being softer than the first coating.

16. The mount of claim 1, wherein the indent has more than three straight sides.

17. The mount of claim 1, wherein the pivot comprises a first coating and the sloped sides of the indent where the pivot makes contact comprise a second coating with a lower hardness than the first coating.

18. The mount of claim 1, the baseplate comprising a pre-applied mask over the indent to prevent paint from entering the indent, the mask comprising an extension to facilitate removal of the mask after painting.

19. The mount of claim 1, the indent, at each point of contact with the pivot, having a radius of curvature smaller than a corresponding radius of curvature of the pivot.

20. The mount of claim 1, the indent having a straight edge and a curved edge.

* * * * *